(12) United States Patent
Susama et al.

(10) Patent No.: US 8,189,748 B2
(45) Date of Patent: May 29, 2012

(54) METHOD AND SYSTEM FOR SENDING SHORT VOICE MESSAGE

(75) Inventors: Pathy Susama, Karnataka (IN); Birdi Roy Singh, Karnataka (IN)

(73) Assignee: Samsung Electronics Co., Ltd (KR)

(*) Notice: Subject to any disclaimer, the term of this patent is extended or adjusted under 35 U.S.C. 154(b) by 1244 days.

(21) Appl. No.: 11/771,715

(22) Filed: Jun. 29, 2007

(65) Prior Publication Data
US 2008/0025482 A1 Jan. 31, 2008

(30) Foreign Application Priority Data

Jun. 30, 2006 (IN) .......................... 1130/CHE/2006
Jun. 28, 2007 (KR) ...................... 10-2007-0064377

(51) Int. Cl.
H04M 1/64 (2006.01)
H04M 11/10 (2006.01)
(52) U.S. Cl. .................................. 379/88.17; 455/413
(58) Field of Classification Search ............... 379/88.17; 455/413
See application file for complete search history.

(56) References Cited

U.S. PATENT DOCUMENTS

| 6,757,365 | B1* | 6/2004 | Bogard | 379/88.17 |
| 6,954,781 | B2* | 10/2005 | Bhattacharya | 709/206 |
| 7,197,122 | B2* | 3/2007 | Vuori | 379/88.25 |
| 7,853,279 | B2* | 12/2010 | Patel et al. | 455/518 |
| 2005/0286689 | A1 | 12/2005 | Vuori | |
| 2006/0234687 | A1* | 10/2006 | Patel et al. | 455/414.2 |

* cited by examiner

Primary Examiner — Davetta W Goins
Assistant Examiner — Mohammad Islam
(74) Attorney, Agent, or Firm — The Farrell Law Firm, P.C.

(57) ABSTRACT

Provided is a system and method for sending a "voice message" to a recipient without any intervention of a network. A user initiates a Short Voice Message (SVM) service (or short voice messaging) function and records a voice message within a device. The user sends the recorded voice message through a normal voice call. During a call setup, the recipient decodes a received call setup message and recognizes the call as a voice message. The recipient sets parameters for recording the voice message. Upon completion of the call setup, the user sends the recorded voice message directly to the recipient. The recipient records the voice message and stores the voice message in an inbox. Thus, the user can be provided with an option for directly sending a voice message without text typing or a text-to-voice conversion technique.

20 Claims, 3 Drawing Sheets

METHOD AND SYSTEM FOR SENDING SHORT VOICE MESSAGE

This application claims priority under 35 U.S.C. §119(a) to an Indian Patent Application filed in the Indian Patent Office on Jun. 30, 2006 and assigned Serial No. 1130/CHE/2006, and Korean Patent Application filed in the Korean Patent Office on Jun. 28, 2007 and assigned Serial No. 10-2007-0064377 the entire disclosure of which is hereby incorporated by reference.

BACKGROUND OF THE INVENTION

1. Field of the Invention

The present invention generally relates to mobile communication, and more particularly to, a method and system for sending a Short Voice Service (SVS) message.

2. Description of the Related Art

A mobile communication service provides a service for sending a simple voice message as well as a text messaging service. For example, U.S. Pat. No. 6,954,781 describes a method to convert a voice message to a text message and send the text message to a mobile communication terminal at a reception side. However, this method requires complex speech recognition algorithms and text-to-speech converters in the mobile communication terminal.

For a voice messaging service, a voice mail box service is also provided. In the voice mail box service, if an originating user connects to a voice mail box using a mobile communication terminal in order to store a message via a voice recording, the voice mail box notifies a receiving user that the message is stored in the voice mail box. The receiving user can connect to the voice mail box by dialing his/her number and retrieve the stored message in order to listen to the message. In other words, in order to retrieve and listen to the message, the receiving user has to dial a number that allows connection to the voice mail box. Aircel, a common carrier, has introduced a technique in which a user can send a voice Short Message Service (SMS) message stored in a network and a receiving mobile communication terminal can retrieve the stored voice SMS message by dialing '535(Link:http://in.rediff.com/money/2006/apr/14mobile.htm)' that is similar to a voice mail box.

U.S. Patent Publication No. 2005-286689 describes sending a voice SMS message to a service center in the form of a text SMS message.

Push-to-talk over Cellular (PoC) refers to a Push-To-Talk (PTT) service provided in cellular mobile networks. PoC, which is based upon packet-switched data transfer, uses Voice-over-Internet Protocol (VoIP) methods to encode voice transmission. In this method, a delay of 1-2 seconds occurs to allow for data buffering related to voice data transmission.

In the Reliance Introduces Talking Message Service (RITMS), a user has to dial a network number to record a message and the network will in turn send the message to a target recipient. If the recipient is busy and does not want to take a talking message call at that time, the user has to retrieve the stored talking message by dialing the same number later. Moreover, all calls made to a particular number such as '1234111' for recording or retrieving a talking message are charged at a particular rate.

The foregoing methods have the following limitations:

1. Speech recognition algorithms are not efficient to process various languages and recognize accents from a variety of users.

2. Text-to-voice converters are expensive to implement in a mobile communication terminal.

3. A cumbersome process of typing a text message corresponding to a voice message using a small keypad is required in order to send the voice message.

4. A user has to know a specific language to input a text message corresponding to a voice message, and thus users who are illiterates cannot use this service.

5. An SMS message cannot be sent in most local languages, which serves as a major constraint.

6. Network intervention is required to store a voice message.

7. Delay may occur during transmission.

8. A voice message can be sent only between mobile networks, and there is no way to send the voice message to a communication network associated with a mobile network.

9. Both an originator and a receiver are charged a fee to send or retrieve a message from a network, respectively.

10. There is a complex process to retrieve a message from a network.

SUMMARY OF THE INVENTION

An aspect of the present invention is to address at least the above problems and/or disadvantages and to provide at least the advantages described below. Accordingly, an aspect of the present invention is to provide a method and system in which an originating user can send a Short Voice Message (SVM) directly to a receiving user, instead of typing a text message corresponding to the SVM.

Another aspect of the present invention is to provide a method and system in which an originating user can record an SVM and a receiving user can receive an SVM without connecting to a network.

According to one aspect of the present invention, there is provided a method for sending a Short Voice Message (SVM). The method includes initiating an SVM service function and recording an SVM by a transmitting device, sending a call setup message as a normal voice call at a request of the transmitting device by a communication network, decoding the received call setup message and recognizing that the call setup message is intended for SVM transmission by a receiving device during a call setup, setting parameters for recording the SVM by the receiving device, upon completion of the call setup, sending the recorded SVM directly to the receiving device by the transmitting device, and recording and storing the received SVM by the receiving device.

According to another aspect of the present invention, there is provided a system for sending a Short Voice Message (SVM). The system includes a transmitting device for initiating an SVM service function, recording an SVM, sending a call setup message, and sending the recorded SVM upon completion of a call setup, a communication network for sending the call setup message received from the transmitting device as a normal voice call and playing and sending the SVM, and a receiving device for decoding the received call setup message and recognizing that the call setup message is intended for SVM transmission during a call setup, setting parameters for recording the SVM, and upon completion of the call setup, recording and storing the SVM received from the transmitting device.

The SVM is sent directly from the originating terminal to the receiving terminal by setting up a normal voice call. The SVM is recorded directly in the receiving terminal and stored in an inbox, together with a notification of the reception of the SVM. Thus, the user can store the SVM in the same manner as storing an SMS message.

According to another aspect of the present invention, if the user is busy due to a meeting or driving and does not want to be disturbed, the user can set a profile such as like no incoming call except for an SMS and/or an SVM.

If a user desires to make a voice call to another user who does not want to be distributed and has set the profile such as no incoming call, the originating user may initiate the voice call and may receive a message like "I'm busy now, so please leave a message and I'll call you later" because the profile such as no incoming call has been set in the receiving terminal. The originating user may speak a message and the message will be directly stored in the receiving terminal without intervention of the users.

BRIEF DESCRIPTION OF THE DRAWINGS

The above and other features and advantages of an exemplary embodiment of the present invention will be more apparent from the following detailed description taken in conjunction with the accompanying drawings, in which.

DETAILED DESCRIPTION OF THE EXEMPLARY EMBODIMENT

Figure 1:
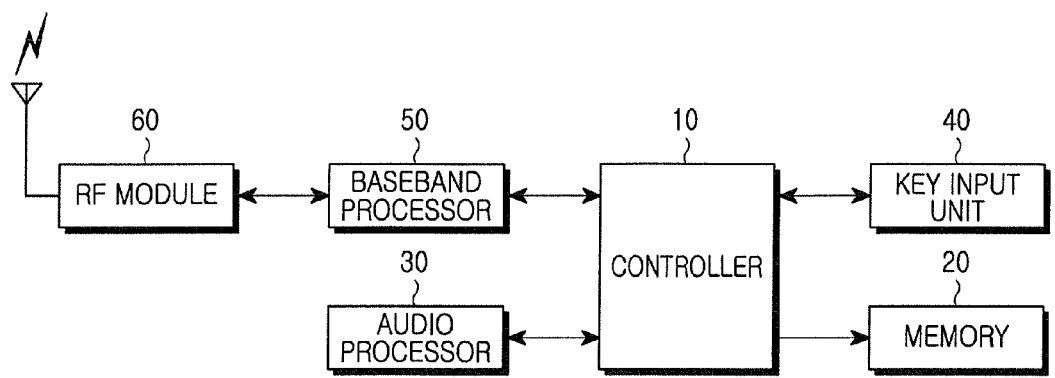
FIG. 1 is a block diagram of a mobile communication terminal according to an exemplary embodiment of the present invention.

The matters defined in the description such as a detailed construction and elements are provided to assist in a comprehensive understanding of an exemplary embodiment of the invention. Accordingly, those of ordinary skill in the art will recognize that various changes and modifications of the embodiment described herein can be made without departing from the scope and spirit of the invention. Also, descriptions of well-known functions and constructions are omitted for clarity and conciseness. Throughout the drawings, the same drawing reference numerals will be understood to refer to the same elements, features and structures.

First, the structure of an apparatus for sending a Short Voice Message (SVM) according to an exemplary embodiment of the present invention will be described. The apparatus for sending an SVM is a terminal capable of generating, sending, receiving, and storing the SVM, such as a mobile communication terminal or other types of communication terminals. Hereinafter, the structure of a mobile communication terminal to which the present invention is applied will be described with reference to the block diagram of FIG. 1.

Referring to FIG. 1, the mobile communication terminal includes a controller 10, a memory 20, an audio processor 30, a key input unit 40, a baseband processor 50, and a Radio Frequency (RF) module 60.

The memory 20 stores programs for processing control operations of the controller 10, reference data, and reserved data that can be updated, and is used as a working memory of the controller 10. The memory 20 also stores program data associated with an SVM service function and includes an SVM storing region according to the present invention. The SVM is a short message composed of voice. The SVM service function generates and sends the SVM, and receives and stores the SVM from another terminal. Detailed functions related to the SVM service function are provided to a user in the form of an SVM menu. The SVM storing region stores at least one SVM and may be divided into an SVM inbox and an SVM outbox. The SVM outbox stores a sent SVM and the SVM inbox stores a received SVM.

The audio processor 30 connected with the controller 10, and a microphone and a speaker connected with the audio processor 30, are used for voice communication and voice recording under the control of the controller 10.

The key input unit 40 includes a *-key, a #-key, various function keys such as a Menu key, a Selection key, a Send key, a Cancel key, an End key, a Volume key, and a Photographing key corresponding to various functions of the mobile communication terminal and provides key input data corresponding to a key pressed by a user to the controller 10. The key input unit 40 includes character keys, each of which are assigned a number 0 through 9 and a plurality of Korean or English alphabet characters.

The RF module 60 transmits and receives a radio signal to/from a mobile communication base station through an antenna. For signal transmission, the RF module 60 modulates a transmission signal input from the controller 10 through the baseband processor 50 into an RF signal, and transmits the RF signal through the antenna. For signal reception, the RF module 60 demodulates an RF signal received through the antenna and provides the demodulated RF signal to the controller 10. The baseband processor 50 processes a baseband signal transmitted and received between the RF module 60 and the controller 10.

Once the SVM service function is executed and an SVM generation mode is set, the mobile communication terminal (herein after "an originating terminal") records a user's voice input through the microphone to generate an SVM. In response to an SVM transmission request, the originating terminal sets up a voice call with a receiving mobile communication terminal (hereinafter "a receiving terminal") through a network, thereby connecting to a voice communication channel. If the receiving terminal is ready to receive the SVM, the originating terminal plays the SVM to be sent and sends the played SVM to the receiving terminal through the connected voice communication channel. The receiving terminal records and stores the received SVM. Since an SVM is sent through a voice communication channel according to the present invention, a SETUP message for setting up a voice call is used. The SETUP message has the same format as that of a setup message for setting up a normal voice call. In order to distinguish call setup for SVM transmission from call SETUP for a normal voice call, a field called User-User information in the SETUP message is adjusted.

Table 1 below shows the coding of User-User information in the SETUP message and is taken from The $3^{rd}$ Generation Partnership Project (3GPP) TS 24.008 standard.

TABLE 1

| User-user protocol discriminator (octet 3) | | | | | | | | |
|---|---|---|---|---|---|---|---|---|
| Bits | | | | | | | | |
| 8 | 7 | 6 | 5 | 4 | 3 | 2 | 1 | Content |
| 0 | 0 | 0 | 0 | 0 | 0 | 0 | 0 | User specific protocol (Note 1) |
| 0 | 0 | 0 | 0 | 0 | 0 | 0 | 1 | OSI high layer protocols |
| 0 | 0 | 0 | 0 | 0 | 0 | 1 | 0 | X.244 (Note 2) |
| 0 | 0 | 0 | 0 | 0 | 0 | 1 | 1 | Reserved for system management convergence function |
| 0 | 0 | 0 | 0 | 0 | 1 | 0 | 0 | IA5 characters (Note 3) |
| 0 | 0 | 0 | 0 | 0 | 1 | 1 | 1 | Rec.V.120 rate adaption |
| 0 | 0 | 0 | 0 | 1 | 0 | 0 | 0 | Q.931 (I.451) user-network call control messages |
| 0 | 0 | 0 | 1 | 0 | 0 | 0 | 0 | Reserved for other network layer or layer 3 protocols including |
| | | | through | | | | | |

TABLE 1-continued

User-user protocol discriminator (octet 3)

| | | | Bits | | | | | |
|---|---|---|---|---|---|---|---|---|
| 8 | 7 | 6 | 5 | 4 | 3 | 2 | 1 | Content |
| 0 | 0 | 1 | 1 | 1 | 1 | 1 | 1 | Rec.X.25 (Note 4) |
| 0 | 1 | 0 | 0 | 0 | 0 | 0 | 0 | National use |
| | | | through | | | | | |
| 1 | 1 | 0 | 0 | 1 | 1 | 1 | 1 | |
| 0 | 1 | 0 | 1 | 0 | 0 | 0 | 0 | Reserved for other network layer or layer 3 protocols including |
| | | | through | | | | | |
| 1 | 1 | 1 | 1 | 1 | 1 | 1 | 0 | Rec.X.25 (Note 4) |

All other values are reserved.
Note 1:
The user information is structured according to user needs.
Note 2:
The user information is structured according to Rec.X.244 which specifies the structure of X.25 call user data.
Note 3:
The user information is composed of IA5 characters.
Note 4:
These values are reserved to discriminate these protocol discriminators from the first octet of an X.25 packet including general format identifier.

User-user signaling USS1 is implicitly activated by a User-User Information Element (IE) of the SETUP message.

Figure 2:
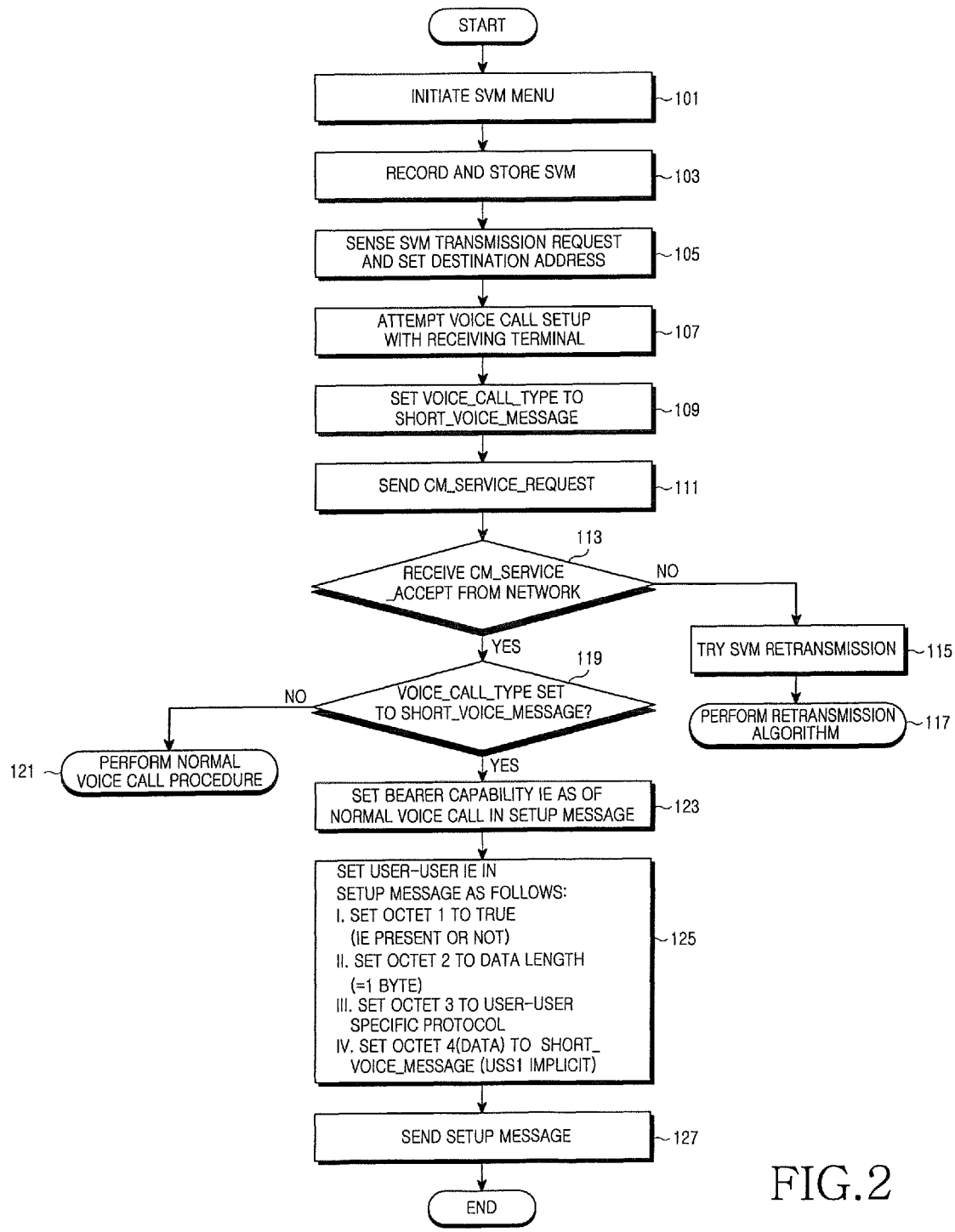
FIG. 2 is a flowchart of the operation of an originating terminal according to an exemplary embodiment of the present invention.
Figure 3:
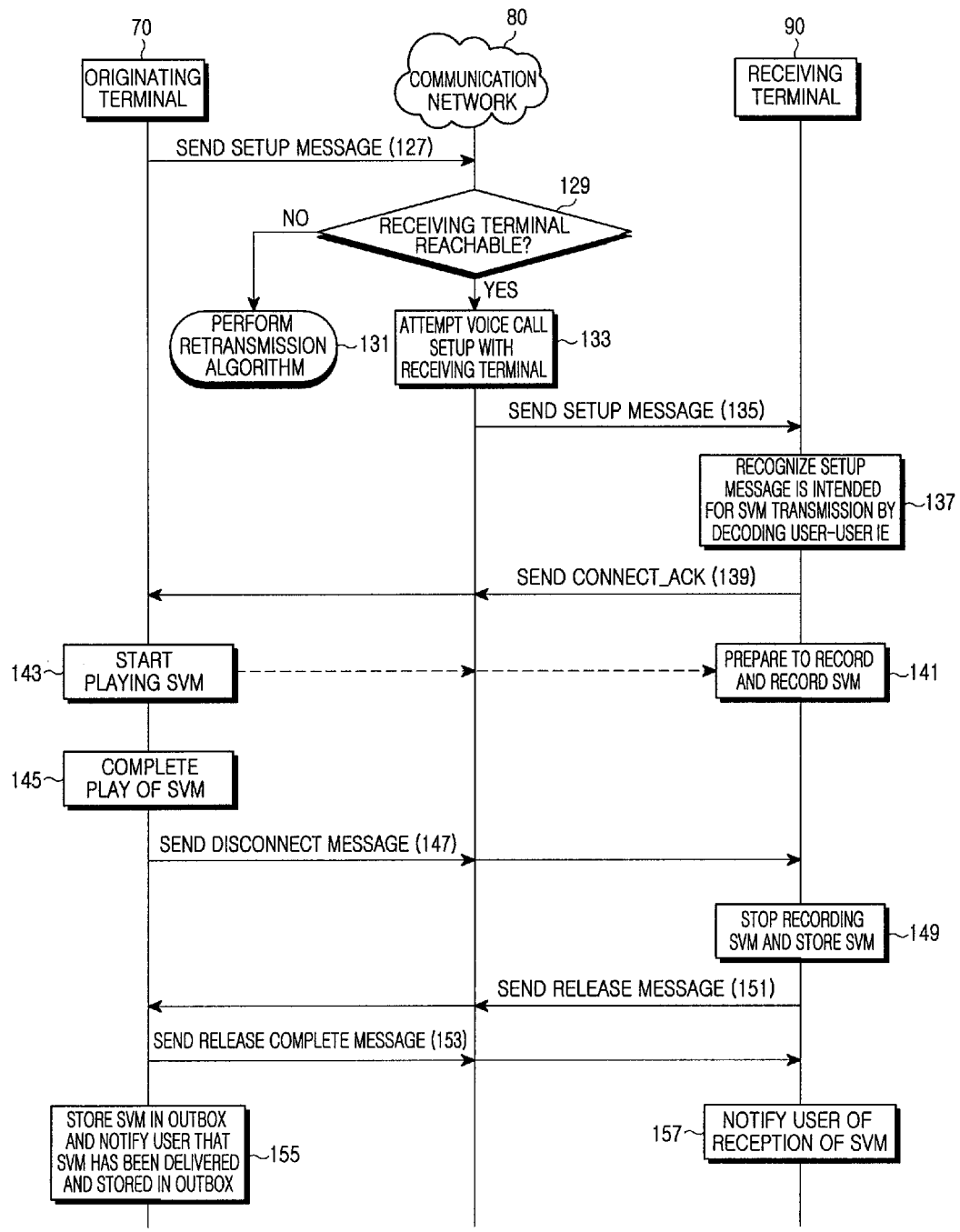
FIG. 3 is a flowchart of the operation of an originating terminal and the operation of a receiving terminal according to an exemplary embodiment of the present invention.

The operations of an originating terminal and a receiving terminal according to an exemplary embodiment of the present invention will be described with reference to FIGS. 2 and 3. FIG. 2 is a flowchart of a process in which an originating terminal 70 generates an SVM and sends a SETUP message according to an exemplary embodiment of the present invention. FIG. 3 is a flowchart of operations of the originating terminal 70, a communication network 80, and a receiving terminal 90 until the receiving terminal 90 receives an SVM after the originating terminal 70 sends the SETUP message in FIG. 2. In the following description, the operations of the originating terminal 70 and the receiving terminal 90 may be performed under the control of the controller 10 of each of the originating terminal 70 and the receiving terminal 90 according to an exemplary embodiment of the present invention.

Referring to FIG. 2, the originating terminal 70 initiates an SVM menu in response to a user input made by, for example, key manipulation in step 101. Upon initiation of the SVM menu, the originating terminal 70 selects a message generation menu and sets an SVM generation mode in order to record and store an SVM in step 103. An originating user may modify or re-record the SVM as desired. Upon completion of the recording, the originating user requests the originating terminal 70 to send the SVM by pressing a SEND button. Thus, the originating terminal 70 senses an SVM send request input from the originating user and sets a destination address input from the originating user in step 105. In step 107, the originating terminal 70 attempts a voice call setup with the receiving terminal 90. According to the present invention, the originating terminal 70 will attempt to set up a normal voice call. The originating terminal 70 determines a flag VOICE_CALL_TYPE in order to distinguish an SVM transmission from normal voice communication. The flag VOICE_CALL_TYPE may have two values, NORMAL_VOICE_CALL and SHORT_VOICE_MESSAGE. The value NORMAL_VOICE_CALL indicates normal voice communication and the value SHORT_VOICE_MESSAGE indicates SVM transmission. Thus, the originating terminal 70 sets the flag VOICE_CALL_TYPE to SHORT_VOICE_MESSAGE in step 109. In step 111, the originating terminal 70 sends CM_SERVICE_REQ to the communication network 80 in order to cause a voice call. In step 113, the originating terminal 70 checks if CM_SERVICE_ACCEPT is received from the communication network 80. If the communication network 80 sends CM_SERVICE_REJECT, the originating terminal 70 proceeds to steps 115 and 117 in order to retry SVM transmission according to a retransmission algorithm given below. If not, and the communication network 80 responds with CM_SERVICE_ACCEPT assuming a normal voice call, the originating terminal 70 goes to step 119 in order to set a parameter of the SETUP message according to the flag VOICE_CALL_TYPE. In other words, if the flag VOICE_CALL_TYPE is set to NORMAL_VOICE_CALL, the originating 70 proceeds to step 121 in order to perform a normal voice communication procedure. If yes, and the flag VOICE_CALL_TYPE is set to SHORT_VOICE_MESSAGE, the originating terminal 70 goes to step 123 in order to set a bearer capability IE of the SETUP message with default parameters as of a normal voice call. In step 125, the originating terminal 70 sets the User-User IE of the SETUP message as follows:

i. Octet 1 is set to TRUE (IE present or not).
   ii. Octet 2 is set to Data Length (=1 byte).
   iii. Octet 3 is set to User-User Specific Protocol.
   iv. Octet 4(data) is set to a value SHORT_VOICE_MESSAGE (USS1 IMPLICIT).

Upon finishing setting the SETUP message, the originating terminal 70 goes to step 127 in order to send the SETUP message to the communication network 80.

The operations of the originating terminal 70, the communication network 80, and the receiving terminal 90 until the receiving terminal 90 receives an SVM will now be described with reference to FIG. 3. As illustrated in FIG. 3, the originating terminal 70 sends the SETUP message to the communication network 80 in step 127 which is the same as step 127 in FIG. 2.

Upon reception of the SETUP message from the originating terminal 70, the communication network 80 checks if the receiving terminal 90 is reachable in step 129. If so, the communication network 80 goes to step 133. If not, the communication network 80 goes to step 131 in order to perform a retransmission algorithm given below. If the receiving terminal 90 is reachable, the communication network 80 attempts to set up a voice call with the receiving terminal 90 in step 133. In step 135, the communication network 80 sends the SETUP message to the receiving terminal 90. After the receiving terminal 90 receives the SETUP message, the communication network 80 will set up a normal voice call. In other words, upon reception of the SETUP message, the receiving terminal 90 recognizes that the SETUP message is intended for a voice call setup for SVM transmission by decoding the User-User IE and sets the flag VOICE_CALL_TYPE to SHORT_VOICE_MESSAGE in step 137. At this time, the receiving terminal 90 will set up a normal voice call without giving any notification to the user of the originating terminal 70. The receiving terminal 90 then sends CONNECT_ACK to the originating terminal 70 through the communication network 80 in order to confirm the call in step 139 and prepares to record the SVM by starting a recorder in step 141. The recording of the SVM is directly performed by the receiving terminal 90 without any intervention of the receiving user.

When the call is established, the originating terminal 70 starts playing the recorded SVM in step 143 upon reception of CONNECT_ACK in step 139. The played SVM is sent to the receiving terminal 90 through the communication network 80, and the receiving terminal 90 records the received SVM. Upon completion of play of the SVM in step 145, the originating terminal 70 sends a DISCONNECT message to the receiving terminal 90 through the communication network 80 in step 147. Upon reception of the DISCONNECT message, the receiving terminal 90 stops recording the SVM and stores the recorded SVM in an SVM inbox folder in step 149 and sends a RELEASE message to the originating terminal 70 through the communication network 80 in step 151. Upon reception of the RELEASE message, the originating terminal 70 recognizes that the SVM has been delivered. The originating terminal 70 then sends a RELEASE COMPLETE message to the receiving terminal 90 through the communication network 80 in step 153 and stores the SVM in an SVM outbox folder and notifies the user that the SVM has been delivered and stored in the SVM outbox in step 155. Upon reception of the RELEASE COMPLETE message, the receiving terminal 90 notifies the user of reception of the SVM in step 157.

The receiving user then can listen to the SVM stored in the SVM inbox whenever he/she wants to. According to another exemplary embodiment of the present invention, an SVM may be automatically played by adding options. If the receiving user is not reachable, and the communication network 80 sends a REJECT message in step 113 because the receiving terminal 90 is switched off, or SVM transmission fails, the originating terminal 70 may try to send the SVM to the receiving user according to a retransmission algorithm given below. If the originating terminal 70 cannot send the SVM within a predetermined period of time, e.g., 48 hours, it deletes the SVM and notifies the user that the SVM cannot be delivered.

Preferably every transmission/retransmission notification will be sent to the user, together with option "Retry" and "Ignore". If the originating user selects the option "Retry", the originating terminal 70 will try to retransmit the SVM at predetermined time intervals up during the predetermined period of time until the SVM is successfully transmitted. For example, the retransmission may be performed 15 minutes, 30 minutes, 1 hour, 2 hours, 4 hours, and every 4 hours after that up to 48 hours. Such a schedule may be set by the user. Table 2 below shows an example of a retransmission algorithm.

TABLE 2

```
static time           initial_time;
static int            time_gap = 15; /* in seconds */
static time           next_time_to_send_SVM;
algorithm_to_send_SVM( )
{
time       current_time;
current_time = get_time_from_system( );
/* checking if we are trying to send SVM for more then 48hrs */
If (time_gap <= 2880)
{
If (next_time_to_send_SVM == current_time)
{
If (pending_SVM == SVM_PENDING_TO_SEND)
{
retransmission_option = notify_USER_for_SVM_retranmission( )
If (retransmission _option = "retry"
{
pending_SVM = NO_SVM_PENDING_TO_SEND;
If (!send_pending_SVM( ))
{
pending_SVM = SVM_PENDING_TO_SEND;
if (time_gap >= 240)
{
/* Now we will send SVM after every 4 hrs */
time_gap = time_gap + 240;
next_time_to_send_SVM = current_time + 240;
}
else
{
time_gap = time_gap * 2;
next_time_to_send_SVM = current_time + time_gap;
```

TABLE 2-continued

```
}
}
}
else
{
/* User selected not to retransmit the message */
delete_pending_SVM( );
pending_SVM = NO_SVM_PENDING_TO_SEND;
}
}
}
}
else
{
/* we cannot send the message since last 48hrs so now delete the
SVM and give a notification to user */
delete_pending_SVM( );
notify_USER_for_SVM_Failure( );
pending_SVM = NO_SVM_PENDING_TO_SEND;
    }
  }
```

The mobile communication terminal to which the present invention is applied has to have a free storage space of at least 1 MB, which can store an SVM of around 1 minute. When the receiving terminal 90 receives the SETUP message from the communication network 80 and recognizes that the SETUP message is intended for SVM transmission, it has to check if it has a sufficiently large memory region for storing an SVM. If not, the receiving terminal 90 rejects an incoming call setup with a cause of "BUSY" and gives the user a notification such as "MEMORY FULL. DELETE SOME SVM FOR INCOMING SVM". Upon reception of the notification, the receiving user can delete some messages using a keypad. If the SVM call drops during SVM transmission, the originating terminal 70 can try SVM retransmission according to the retransmission algorithm. The receiving terminal 90 stores the SVM that has been recorded until the SVM call drops. If the receiving terminal 90 receives an SVM while being busy with a normal Circuit Switch (CS) call, it sends a busy tone and the originating terminal 70 receives the busy tone and tries SVM retransmission according to the retransmission algorithm. If the originating terminal 70 receives a normal voice call when transmitting an SVM, it sends a busy tone to the normal voice call. If the receiving terminal 90 receives a normal voice call when receiving an SVM, it sends a busy tone to a normal voice call originating terminal. When the receiving terminal 90 is on a Packet Switch (PS) call, it can receive an incoming SVM in a background, without affecting the ongoing PS call. According to the present invention, an SVM can be set to be transmitted on a particular date. In other words, the user can transmit an SVM at some post dated time. To this end, the user has to set time and a date for transmission in an option field of the SVM. The mobile communication terminal then will send the SVM to the receiving terminal on the set time and date.

According to another exemplary embodiment of the present invention, an SVM can be sent even to a wired terminal connected to a land line, instead of a mobile communication terminal. When the originating terminal 70 sends an SVM to the wired terminal connected to the land line, a voice call session is established. If someone picks up the phone at the receiving side, the recorded SVM will be played in the originating terminal 70 and the receiving user can listen to the played SVM.

According to the present invention, users can send a message in languages they know, irrespective of language and a real-time service can be provided without any delay in transmission. Any user who cannot read or write can easily use a messaging service, and a cumbersome process of typing on a small keyboard can be avoided. Moreover, existing 2G/3G technology can be used without need for General Packet Radio Service (GPRS) technology and an SVM may also replace an SMS. A message can be recorded with simple key manipulation, instead of inputting a number of keys, providing ease of use. Furthermore, an SVM can be transmitted irrespective of receiving terminal types. Additionally, no extra cost is involved in terms of a communication network. A user can send an SVM of any length as long as the SVM is smaller than a free memory capacity available at originating and receiving terminals. If a memory capacity supported by a terminal is sufficient, there may be no limit to the length of the SVM. Only the originating side will be charged for the service and the receiving side does not need to pay for message reception.

While the invention has been shown and described with reference to an exemplary embodiment thereof, it will be understood by those skilled in the art that various changes in form and details may be made therein without departing from the spirit and scope of the invention.

What is claimed is:

1. A method for sending a Short Voice Message (SVM), the method comprising:
    initiating, by a transmitting device, an SVM service function and recording an SVM;
    sending, by a communication network, a call setup message as a normal voice call to a receiving device, at a request of the transmitting device;
    decoding, by the receiving device, the received call setup message and recognizing, during a call setup, that the call setup message indicates an upcoming transmission of the SVM;
    setting, by the receiving device, parameters for recording the SVM and establishing the normal voice call with the transmitting device according to the SVM call setup message;
    sending, by the transmitting device, the recorded SVM directly to the receiving device through the established normal voice call; and
    recording and storing, by the receiving device, the received SVM.

2. The method of claim 1, wherein the recording of the SVM comprises modifying the recorded SVM at a request of a user.

3. The method of claim 1, further comprising storing the SVM and notifying a user of the reception of the SVM by the receiving device.

4. The method of claim 1, wherein a predetermined field of the call setup message is set to a value indicating that the call setup message is a call setup message for setting a normal voice call for SVM transmission.

5. The method of claim 1, wherein the communication network sets up a normal voice call after receiving the call setup message from the transmitting device.

6. The method of claim 1, further comprising automatically playing the received SVM by the receiving device.

7. The method of claim 1, wherein the transmitting device sets a time for SVM transmission to a particular time received by the transmitting device through user input.

8. A system for sending a Short Voice Message (SVM), the system comprising:
    a transmitting device for initiating an SVM service function, recording an SVM, sending a call setup message, and playing and sending the recorded SVM upon completion of a call setup;
    a communication network for receiving the call setup message from the transmitting device as a normal voice call and sending the SVM; and
    a receiving device for decoding the received call setup message and recognizing, during the call setup, that the call setup message indicates an upcoming transmission of the SVM, setting parameters for recording the SVM, and upon completion of the call setup, recording and storing the SVM received from the transmitting device.

9. A method for sending a Short Voice Message (SVM) in a mobile communication terminal, the method comprising:
    receiving, from a communication network, a call setup message as a normal voice call;
    decoding the received call setup message and recognizing, during a call setup, that the call setup message indicates an upcoming transmission of an SVM;
    setting parameters for receiving the SVM and establishing the normal voice call with an originating device according to the SVM call setup message; and
    receiving, from the originating device, a first SVM through the established normal voice call.

10. The method of claim 9, further comprising:
    recording and storing a second SVM in response to a user input; and
    requesting a normal voice call setup with a receiving terminal in response to an SVM transmission request,
    wherein the requesting the normal voice call setup includes:
    sensing generation of the SVM transmission request; and
    sending a call setup message including a value indicating a normal voice call setup message for SVM transmission.

11. The method of claim 10, wherein the SVM transmission request is generated in response to a user input.

12. The method of claim 10, wherein the SVM transmission request is generated at a predetermined time, the predetermined time being received through user input.

13. The method of claim 10, further comprising:
    upon completion of normal voice call setup corresponding to the requesting the normal voice call setup, playing and sending the second SVM to the receiving terminal according to the completed normal voice call setup,
    wherein playing and sending the second SVM includes:
    receiving a CONNECT_ACK message from the receiving terminal;
    playing and sending the second SVM; and
    upon completion of the play of the second SVM, sending a DISCONNECT message.

14. The method of claim 9, wherein receiving the first SVM comprises:
    recording the received first SVM:
    upon reception of the DISCONNECT message from the originating device, completing the recording of the first SVM and storing the first SVM;
    sending a RELEASE message to the originating device and notifying a user of the reception of the first SVM upon reception of a RELEASE COMPLETE message from the originating device; and
    playing the first SVM in response to a play request.

15. The method of claim 10, further comprising generating the SVM transmission request at a predetermined time in order to try retransmission of the second SVM, if the SVM transmission fails.

16. A mobile communication terminal for sending a Short Voice Message (SVM) in a mobile communication terminal, the mobile communication terminal comprising:
    a controller for receiving, from a communication network, a call setup message as normal voice call, decoding the received call setup message and recognizing, during a call setup, that the call setup message indicates an upcoming transmission of SVM, setting parameters for receiving SVM and establishing the normal voice call with a originating device according to the SVM call setup message, and receiving a first SVM through the established normal voice call from the originating device; and a memory for storing the received first SVM.

17. The mobile communication terminal of claim 16, wherein the mobile communication terminal further comprises an audio processor for recording a voice under the control of the controller, and wherein the controller records the received first SVM using the audio processor, completes the recording of the first SVM and stores the SVM upon reception of the DISCONNECT message from the originating device, sends a RELEASE message to the originating device, notifies a user of the reception of the SVM upon reception of a RELEASE COMPLETE message from the originating device, and plays the first SVM in response to a play request.

18. The mobile communication terminal of claim 16, wherein the mobile communication terminal further comprises an audio processor for recording a voice under the control of the controller, and wherein the controller records a second SVM in response to a user input using the audio processor and sends a call setup message including a value indicating a normal voice call setup message for SVM transmission according to a transmission request for the second SVM.

19. The mobile communication terminal of claim 18, wherein the transmission request is generated at a predetermined time, the predetermined time being received through user input.

20. The mobile communication terminal of claim 18, wherein the controller play and sends the second SVM to the receiving terminal upon completion of normal voice call setup corresponding to the transmission request for the second SVM, and sends a DISCONNECT message upon completion of the play of the second SVM.

* * * * *